No. 746,202. PATENTED DEC. 8, 1903.
C. O. TOOKER.
PERMUTATION PADLOCK.
APPLICATION FILED FEB. 26, 1903.
NO MODEL. 2 SHEETS—SHEET 1.
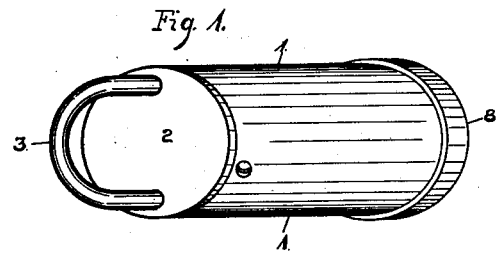
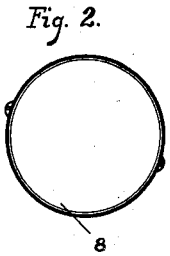
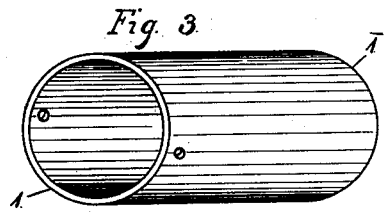
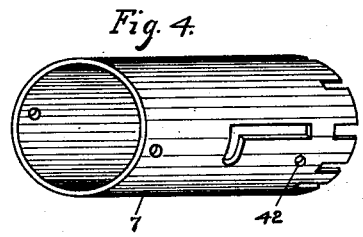
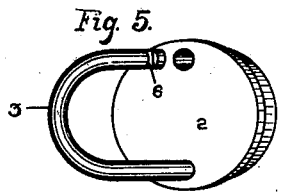
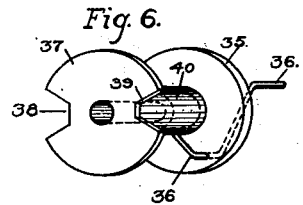
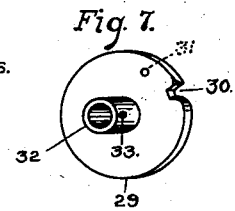
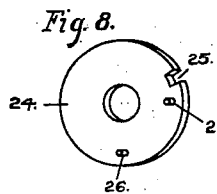
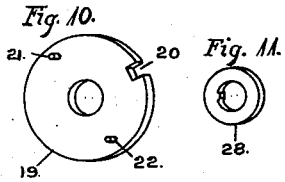
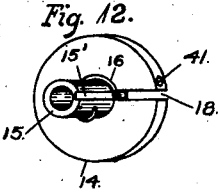
WITNESSES:
Edwin C. Dozier.
Herbert R. Marlatt.
C. O. TOOKER.
INVENTOR.
BY Robert W. Randle.
ATTORNEY.

No. 746,202. PATENTED DEC. 8, 1903.
C. O. TOOKER.
PERMUTATION PADLOCK.
APPLICATION FILED FEB. 26, 1903.
NO MODEL. 2 SHEETS—SHEET 2.
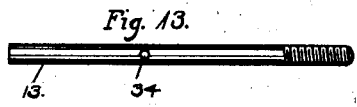
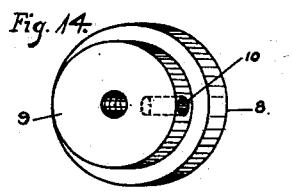
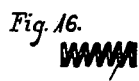
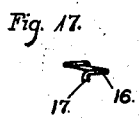
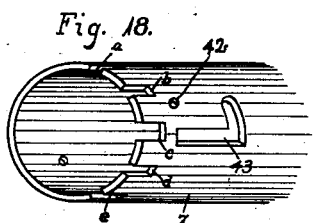
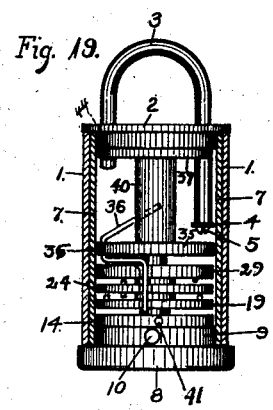
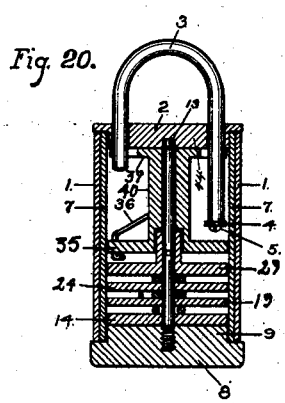
WITNESSES:
Edwin C. Dozier.
Herbert R. Marlatt.
C. O. TOOKER.
INVENTOR.
BY Robert W. Randle,
ATTORNEY.

No. 746,202.  
Patented December 8, 1903.

UNITED STATES PATENT OFFICE.

CHARLES O. TOOKER, OF RICHMOND, INDIANA.

PERMUTATION-PADLOCK.

SPECIFICATION forming part of Letters Patent No. 746,202, dated December 8, 1903.

Application filed February 26, 1903. Serial No. 145,240. (No model.)

*To all whom it may concern:*

Be it known that I, CHARLES O. TOOKER, a citizen of the United States, residing in the city of Richmond, in the county of Wayne and State of Indiana, have invented new and useful Improvements in Permutation-Padlocks, of which the following is a specification, which, taken in connection with the accompanying drawings, forming a part thereof, is sufficiently clear and concise as to enable others skilled in the art to which it appertains to make and use the same.

My present invention relates to permutation-locks in which the movable parts are capable of transposition in order that they may be arranged in any concerted order for the purpose of releasing the bow from the securing mechanism.

The particular object of my present invention is to provide means for holding the disks or tumblers of a permutation-padlock in their adjusted relations to the shaft and with one another in order to attain the proper alinement of the several parts and to compensate for wear thereof.

Other objects and advantages of my invention will appear from the accompanying drawings and from the following description of the construction and statement of operation.

My invention consists in a permutation-padlock embodying certain new and useful features and details of construction and relative disposition of the several parts, substantially as particularly described otherwhere in this specification and in the legitimate combinations herein set forth.

For a more thorough understanding of my invention I will now proceed to take up the description of my invention in detail, which I will state as briefly and compactly as I may.

Referring now to the drawings, Figure 1 is an isometrical view of my invention complete and properly assembled. Fig. 2 is an end view of same. Fig. 3 is an isometrical view of the outside casing. Fig. 4 is an isometrical view of the inside casing. Fig. 5 is an isometrical view of the cap and bow. Fig. 6 is a perspective view of spool, showing the bow-securing arrangement. Fig. 7 is a perspective view of the disk to be secured to the main shaft. Fig. 8 shows one of the movable disks. Fig. 9 shows one of the washers. Fig. 10 shows one of the movable disks similar to that disk shown in Fig. 8. Fig. 11 shows a washer similar to that shown in Fig. 9. Fig. 12 is a perspective view of the master-disk to be permanently secured to the inside casing. Fig. 13 is a view of the shaft to be secured to and extend in from the center of the turning-knob. Fig. 14 is a perspective inside face view of the turning-knob. Fig. 15 is a view of the ball-click. Fig. 16 shows the coil-spring to support the ball-click and retain it in contact with the inside casing. Fig. 17 is a view of my spring-washer. Fig. 18 is an isometrical view showing one end of the inside casing opposite to that shown in Fig. 4, being the end adjoining the turning-knob. Fig. 19 is an introspective view of the assembled parts, the outside and inside casings being shown in central section. Fig. 20 is true longitudinal central section of my entire lock.

Similar indices refer to and denote similar parts throughout the several views.

Referring now to the drawings in detail, the numeral 1 represents the outside casing of my lock, onto one end of which is fitted the cap 2, with two oppositely-disposed holes in the latter, near the outer edge thereof, to receive the respective ends of the bow 3. One arm of the bow 3 is longer than the other, and on the end of the longer member is secured a washer 4, of larger diameter than the bow, secured by a screw 5 in order that this arm of the bow may not be removed from the cap 2, still being free to operate therein. Near the lower end of the shorter arm of the bow 3 is cut a notch 6 for the purpose which will hereinafter appear. The diameter of the cap 2 is the same as the casing 1, except that its lower portion is cut in forming a shoulder to a diameter the same as the inside of the inside casing 7, forming a rabbet in the periphery of the cap 2 for receiving the upper ends of the casings 1 and 7 and to which they may be secured. The outside diameter of the inside casing 7 is slightly smaller than the inside diameter of the outside casing 1 in order that the outside casing 1 may neatly fit over and completely cover the inside casing, and the outside casing and the inside casing are of equal length, substantially as shown.

The numeral 8 represents the turning-knob, whose outside portion is somewhat greater in diameter than the outside casing 1 and whose inner integral flange portion 9 is of a diameter to loosely enter the end of the inside casing. Into the flange 9 is formed a round hole 10 at right angles to the axial direction of the lock, which is adapted to receive and seat the coil-spring 11, which spring 11 when expanded is somewhat longer than the depth of said hole 10. The numeral 12 represents a ball only slightly smaller than said hole 10, and is adapted to be seated in the outside end of the spring 11 and to enter the hole 10 when said spring is compressed. Into the periphery of one end of the inside casing 7 is cut a plurality of unequally-spaced slots, as a, b, c, d, and e, as shown in Fig. 18, into which slots the ball 12 is adapted to engage as the casing 7 is revolved. Extending inward from the center of the flange 9 and permanently secured therein is the axle or shaft 13, somewhat less in length than the casings.

The numeral 14 represents a comparatively thick disk of same diameter as the flange 9 and with a thimble 15 extending inward therefrom and integral thereof. Extending in the axial direction through the disk 14 and the thimble 15 is a central opening to receive therethrough the shaft 13. Around the thimble 15 is placed a spring-washer 16, Fig. 17, with an outturned point or end 17, adapted to engage in the opening or slot 18 to prevent said washer from revolving other than with the thimble 15. At one point along the periphery of the thimble 15, extending in the axial direction, is a small groove 15', the purpose of which will hereinafter appear.

The numeral 19, Fig. 10, represents a tumbler of same diameter as the disk 14, with a central opening therethrough to receive the thimble 15 and with a notch 20 formed in its periphery. Near the edge and extending in an axial direction inward from the face of the tumbler 19 are two permanent pins 21 and 22, equidistant from the center and from the notch 20. The tumbler 19 is adapted to be placed on the thimble 15 and to be slightly separated from the disk 14 by said spring-washer 16.

The numeral 23, Fig. 9, represents a washer with a central opening to receive the thimble 15 and with a spur extending into its central opening to engage in the groove 15'.

Next in order is the tumbler 24, of same diameter as the tumbler 19, with a central opening therein to receive the thimble 15 and with a notch 25 in its periphery, as shown in Fig. 8. Near the outer edge and extending in an axial direction and inward from the face of the tumbler 24 are two pins 26 and 27, and the pin 27 also extends out the same distance on the opposite side of the tumbler 26, as shown in Fig. 19, the position of the pins in the tumbler 26 being relatively as shown in Fig. 8. The numeral 28, Fig. 11, represents a washer, with a central opening to receive the thimble 15 and with a spur extending into said central opening to engage in the groove 15', and this washer is substantially the same as the washer 23. The numeral 29 represents a disk of same diameter as said tumblers, with a notch 30 formed in its periphery, one side of said notch being beveled and curved out gradually into the periphery of the disk, as shown in Fig. 7. In the face of the disk 29 toward the tumblers is placed a pin 31. (Indicated in Fig. 7 and its relative position is shown in Fig. 7.) The disk 29 has a central opening to surround and cover the end of the thimble 15, and on the opposite side thereof extends out a flange 32, through which is a central opening of a size to receive the shaft 13. The disks, washers, and tumblers being now placed in the positions above indicated, the disk 29 is pressed slightly toward the tumblers against the resiliency of the spring-washer 16, and a hole 33 is made through the flange 32, and a corresponding hole 34 is made through the shaft 13, into which a pin is inserted to hold said parts in their proper positions and in their interdependent and coöperating relationship one with another. Referring now to Fig. 6, the numeral 35 represents a disk of same diameter as said tumblers, with a small hole formed in an axial direction therethrough near its edge to receive the detent 36.

The numeral 37 represents the locking-plate, having formed in its periphery two oppositely-disposed tapering notches 38 and 39, the former being somewhat the larger. The diameter of the locking-plate 37 is the same as the diameter of the disk 35, and these two members are integrally united at some distance apart by the sleeve 40. A central opening is formed in axial direction through the sleeve 40, the disk 35, and the plate 37, the diameter of said opening being at the disk end of a size to receive the projecting end of the flange 32, and the remainder being of a size to receive the axle 13.

The detent 36, Figs. 19 and 20, is formed of a single wire bent into substantially four portions, as follows: the portion which passes through the said hole, forming the axle for the detent, the portion bent at right angles thereto on the outside of the disk 35, the portion bent at right angles to the latter, (which part forms the fence,) and the opposite end bent inward at an angle and adapted to rest, normally, on the sleeve 40, as shown. The detent 36 is formed of spring-wire, the fence portion being forced into the notches in the disks by the resiliency of the detent when said notches are in alinement therewith, as in Fig. 19, in which the portion of the detent resting on the sleeve 40 acts as a lever therefor, and the fence is forced outward out of said notches by turning the disk 29, causing the fence to travel on the beveled and curved side of the notch 30, thus forcing the fence into the opening 43 of the casing 7.

In the periphery of the disk 14 is a threaded screw-hole 41, and a corresponding hole 42 is formed through the inside casing 7.

The numeral 43 represents an angular opening in the casing 7, in which the fence portion of the detent 36 may play.

The numeral 44 represents the inner flange of the cap 2, of same size as the locking-plate 37, against which it is adapted to contact, and the point of the shaft 13 is pivoted in said flange 44, substantially as shown in Fig. 20.

The tumblers and disks being assembled as above stated, I now place the notches 20, 25, and 30 in alinement and then place the disk 35 and its integral members—the thimble 40 and the locking-plate 37—on the axle 13 in the positions shown in Figs. 19 and 20 and cause the fence of the detent 36 to lie in said notches 20, 25, and 30. I next place the coil-spring 11 in the hole 10, pressing the spring in and placing the ball 12 therein. I now place the casing 7 over the mechanism with the notched end in the shoulder of the knob 9, whereby the ball 12 will engage in the notches a, b, c, d, and e. I then insert a screw into the hole 42, which passes beyond and into the hole 41 of the disk 14. I then bring the casing 1 over the casing 7. The cap 2 is then placed in position, entering the longer arm of the bow 3 in the notch 38 and the short arm thereof in the notch 39 of the locking-plate. The ends of the casings 1 and 7 should then be permanently secured to the cap 2 in any manner desired, and the lock will then be ready for use.

In operation the tumblers are set with their notches in proper alinement by rotating the knob 8 back and forth, according to a preconcerted series known only to the owner, and when so adjusted the fence of the detent will drop into the notches 20, 25, and 30. Then by a slight movement of the knob 8 all of the interior mechanism will be moved, carrying the sides of the notch 39 out of engagement with the notch 6, and thus releasing the bow 3 and allowing the short arm thereof to be withdrawn from its hole in the cap 2, as in Fig. 5. The bow 3 may be replaced, as in Figs. 19 and 20, and the combination of the tumblers broken up, when the bow will be secured.

My invention is perfectly adapted to accomplish the results for which it is intended, and it is evident that changes in and modifications of the specific construction herein shown and described may be made and that analogous parts may be used to accomplish the same results without departing from the spirit of my invention or sacrificing any of its many advantages, and the specific construction of the details of my invention, in which novel features are embodied, may be variously changed without altering the essential principles which are claimed as new.

The terms "inward," "outward," and other similar terms are used only for convenience of description, and it is not intended by their use to limit the arrangement of the several parts to the relative positions indicated; but they may be variously changed and modified to suit the various requirements of different types of locks.

Having now fully shown and described my invention and the best means for its construction to me known at this time, what I claim as new, and desire to secure by Letters Patent of the United States, is—

A permutation-padlock comprising in combination, an outer and an inner casing, a cap carrying a movable bow with arms of different length extending into the interior of the casing, the cap secured to one end of said casings, a knob revolubly mounted on the opposite end of the casings, a shaft secured to the knob and extending centrally through the interior of the casing, a series of disks and tumblers mounted on said axle separated by washers, a spring-washer forming a resilient contact for said parts, a series of pins in the faces of the tumblers and main disk, notches formed in the peripheries of the tumblers and the master-disk, a locking-plate and a disk connected by a thimble also mounted on said shaft, a detent having a fence adapted to engage in the notches of the tumblers and the master-disk when said notches are in alinement, a spring-actuated click mounted in the flange of the knob and adapted to act on notches in the end of the inside casing, all substantially as shown and described.

In testimony whereof I have hereunto signed my name to this specification in the presence of two subscribing witnesses.

CHARLES O. TOOKER.

Witnesses:
R. W. RANDLE,
R. E. RANDLE.